(No Model.)
F. H. CORNELL.
OIL INJECTOR.
No. 506,418. Patented Oct. 10, 1893.
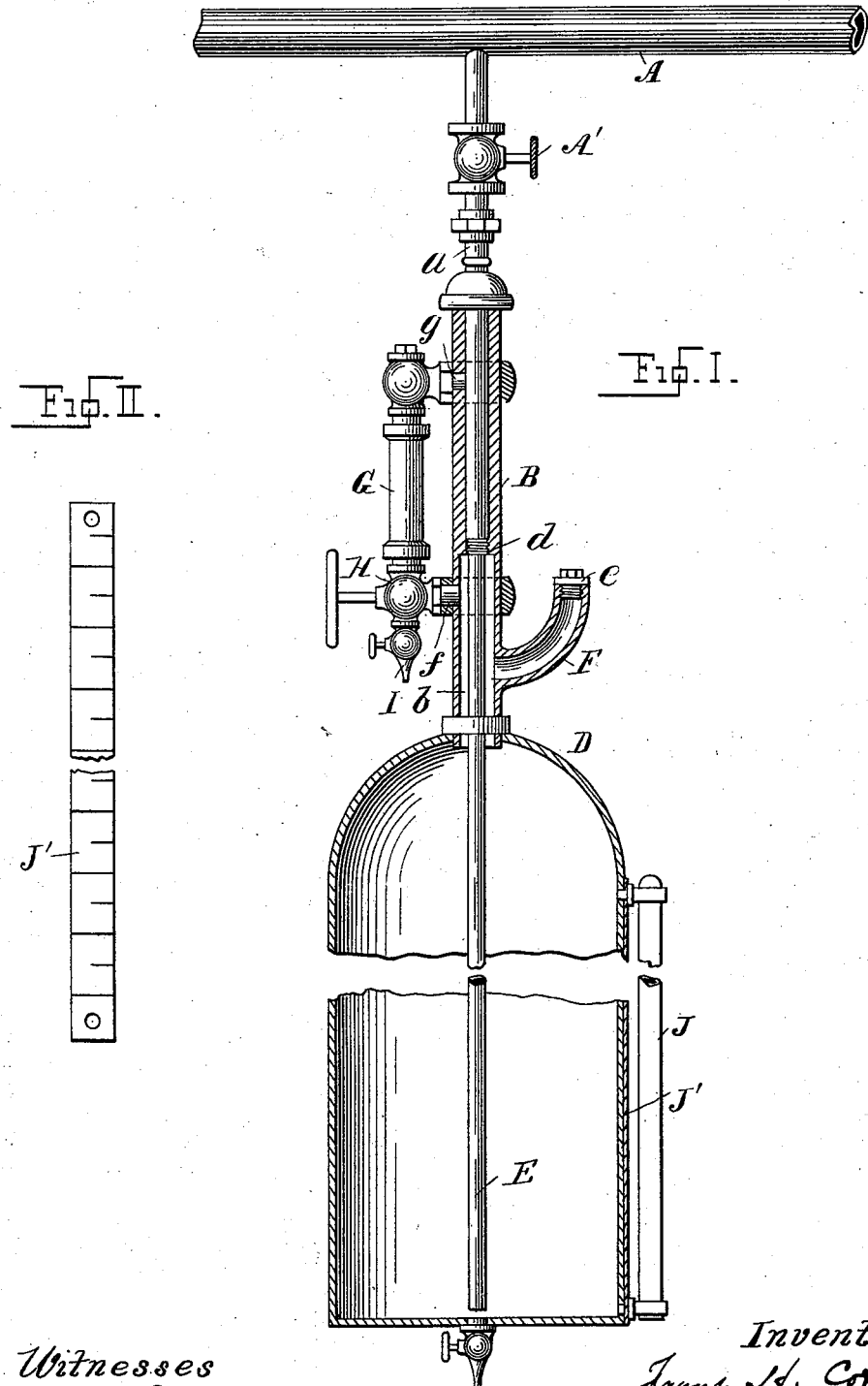
Witnesses
Wm H Courtland
L Woolsey
Inventor
Frank H Cornell
By Knight Bros
Attys

UNITED STATES PATENT OFFICE.

FRANK H. CORNELL, OF NEW YORK, N. Y.

OIL-INJECTOR.

SPECIFICATION forming part of Letters Patent No. 506,418, dated October 10, 1893.

Application filed March 13, 1893. Serial No. 465,707. (No model.)

*To all whom it may concern:*

Be it known that I, FRANK H. CORNELL, a citizen of the United States, residing in the city, county, and State of New York, have invented certain new and useful Improvements in Oil-Injectors, of which the following is a specification.

My invention relates to that class of injectors wherein a predetermined amount of oil can be fed to the boiler with the water for the latter and the objects of the invention are to secure this result in a simple and satisfactory manner.

Reference is to be had to the accompanying drawings forming part of this specification wherein—

Figure 1 illustrates a central cross section of my improved oil injector and Fig. 2 shows the gage J'.

The letter A in the drawings indicates a pipe that is designed to supply water to a boiler.

B is a pipe or tube adapted to be connected with pipe A, say, by a suitable coupling $a$ having a regulating cock A'. The pipe B, leads into a suitable oil reservoir or chamber D, preferably terminating therein near its upper part as shown. Within the pipe B, is placed a smaller pipe E that extends within pipe B, a suitable distance and projects from the pipe B to near the bottom of the reservoir or chamber D. The pipe or tube E is connected to and forms a continuation of pipe B and the water from pipe A passes through pipe B to pipe E and so on to the reservoir D. A space $b$ is formed between pipes B and E as shown. A convenient means for connecting pipes B and E so as to form the space $b$, is to bore the pipe B out for a portion of its length and leave a shoulder $d$, at which part the threaded end of pipe E may be screwed into corresponding threads within pipe B, as shown. With this arrangement water from pipe B will not enter space $b$.

I connect a branch pipe F with the pipe B at the space $b$ and provide the branch F with a plug or stopper $e$. By means of this arrangement oil is fed into the reservoir D when it is necessary to renew same.

G is a by-pass pipe or tube having an extension tube $f$, connecting with space $b$ of pipe B and another extension tube $g$, connecting with the main part or water-passage-portion of pipe B, as shown. The pipe G is also provided with a suitable valve or cock H, to regulate the passage of oil, and it may also have a suitable vent or drop cock I.

J is a suitable glass gage connected with oil reservoir D, to indicate the quantity of oil therein. The graduated gage plate is located at J' immediately to the rear of the said glass and on it I indicate the marks for gills, pints, quarts and gallons, so that as the oil is fed out and the water feeds in the height of the water will register on this meter and thus predetermined quantities or volumes of oil can be fed out and the total amount ascertained for any special period of time. The quantities of oil to be fed out can therefore be nicely and automatically regulated and adjusted.

The operation of my injector is as follows:—The reservoir or chamber D being filled with oil, water from the pipe A will pass through pipes B and E, and beneath the oil thus raising the latter and causing it to pass into space $b$ and tube $f$. Water will also pass from pipe B into pipe G through the pipe $g$ above the valve or cock H and thus an equilibrium at the latter point will be established. The cock H can now be turned as much as desired, whereupon oil will pass into the water in pipe G and by rising through the same will enter the water in pipe A, and thus pass to the boiler. From this it will be understood that oil will percolate into the feed water for the boiler by its own gravity because the pressure is equalized and the oil rises to the feed water pipes, and thus an even supply of oil can be produced. As the oil passes from reservoir D it will be replaced by incoming water entering below it, the latter always tending to raise the oil to the cock H.

A particular advantage of my improvement is that no matter what the pressure in pipe A is the pressure on the oil will be equalized. As the pressure on the opposite sides of cock H will be the same, the oil can readily percolate through the water above the cock H.

It will be observed that I use but one pipe between the main pipe A and the reservoir D, for both passing water to the latter and carrying away the oil. By this means the feed of the oil to the boiler water is accomplished without creating a flow for the purpose of carrying away the oil, the latter feeding automatically to the water by the difference of gravity between itself and the water above.

Having thus described my invention, the following is what I claim as new therein and desire to secure by Letters Patent:

1. In an oil injector, the combination with a reservoir or chamber, of a pipe entering the same, said pipe having two compartments, one for the supply of water and the other for the exit of oil, and a separate by-pass pipe connecting the latter compartment with the former, substantially as described.

2. In an oil injector, the combination of an oil reservoir D, with a pipe B entering the same, a pipe E secured in pipe B, and projecting therefrom into reservoir D, and forming a space $b$ and with a pipe G connecting at opposite parts with said space $b$ and with pipe B, and a regulator H, connected with pipe G, substantially as described.

3. In an oil injector, the combination of an oil reservoir with a pipe B, a pipe E therein forming a space $b$, a pipe G, tubes $f$ and $g$, extending from pipe G to space $b$, and pipe B, respectively, and a regulator H, substantially as described.

FRANK H. CORNELL.

Witnesses:
W. H. BURNETT,
HENRY COLE SMITH.